Patented Aug. 4, 1936

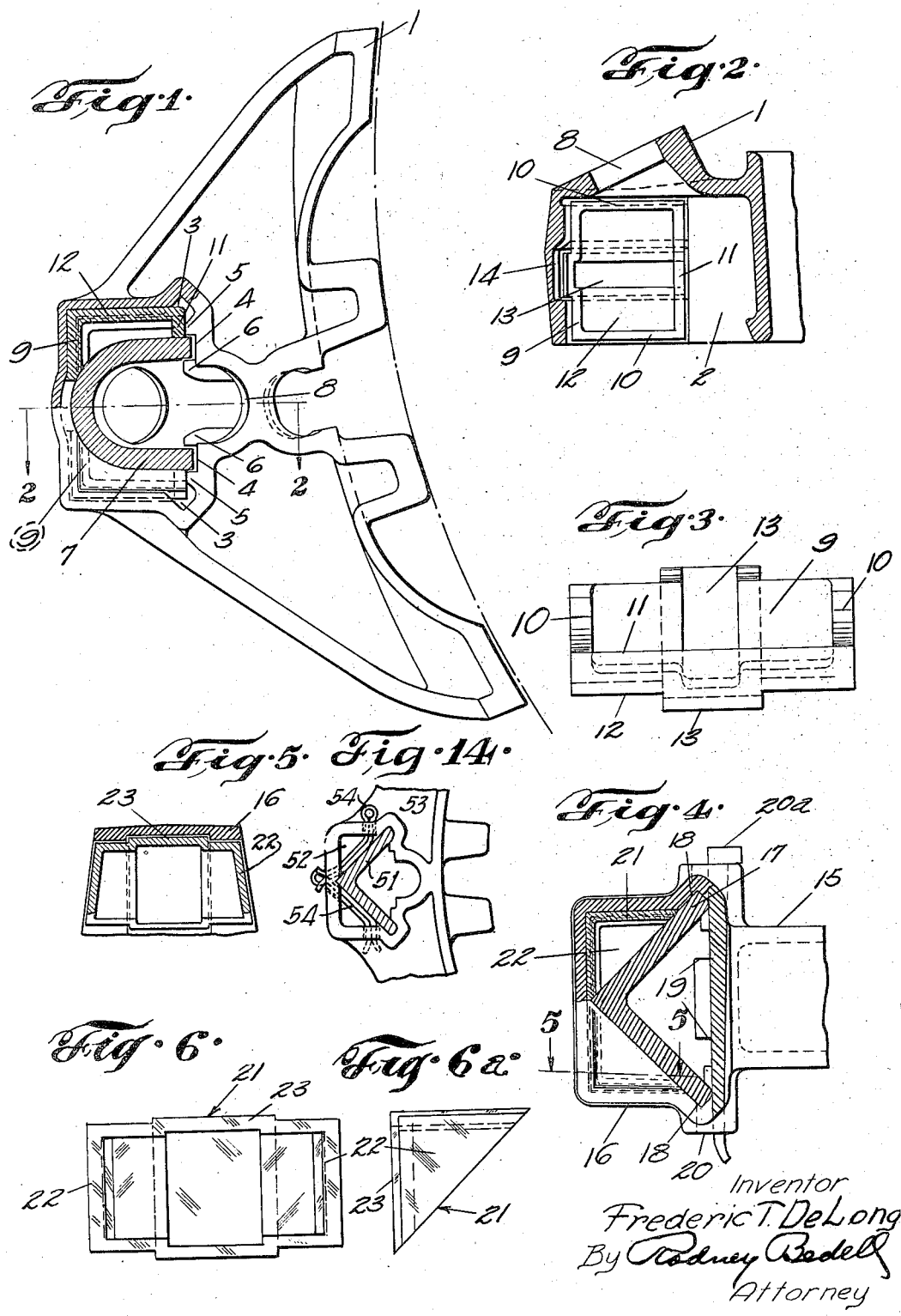

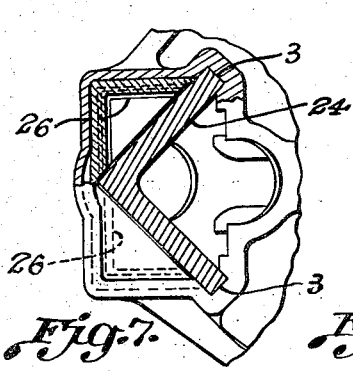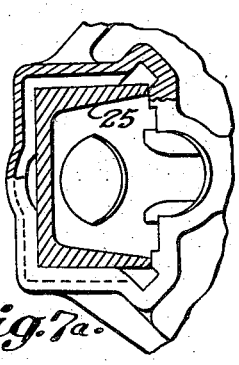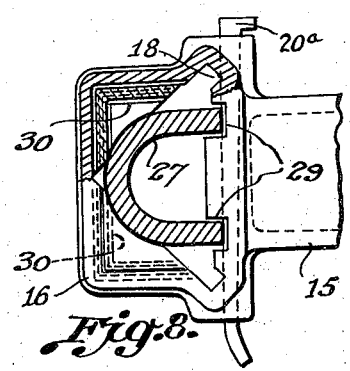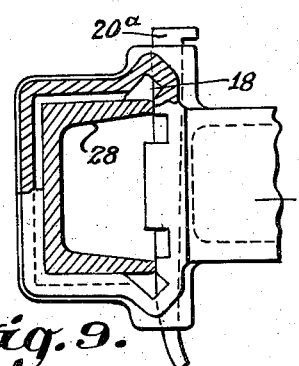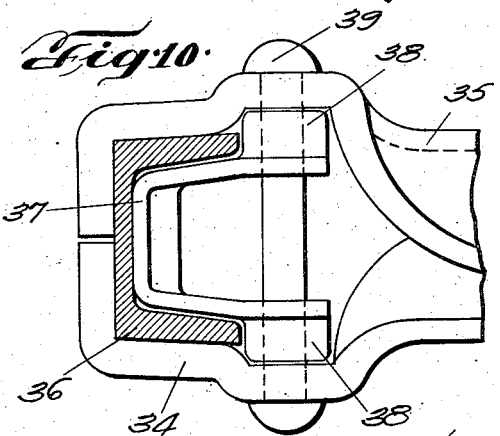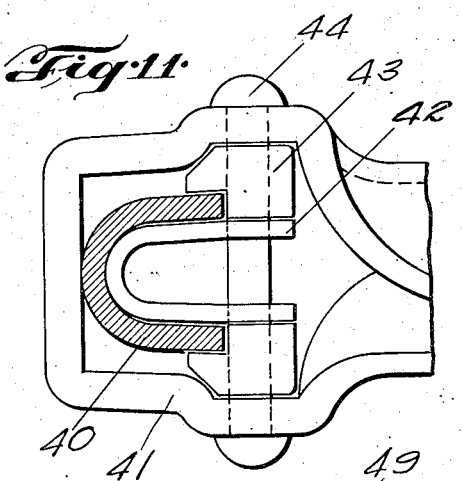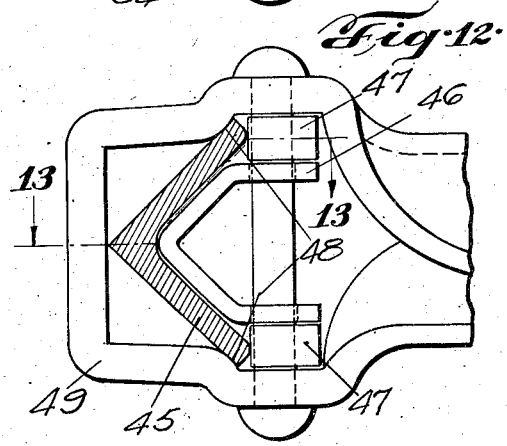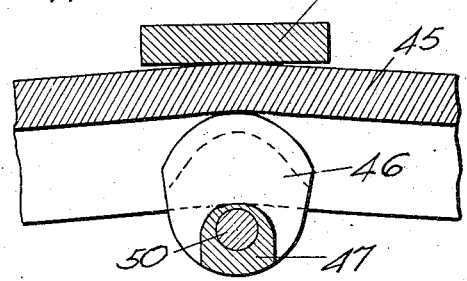

2,049,536

UNITED STATES PATENT OFFICE 2,049,536

BRAKE BEAM STRUCTURE

Frederic T. De Long, Chicago, Ill., assignor to Chicago Railway Equipment Company, Chicago, Ill., a corporation of Illinois Application July 25, 1932, Serial No. 624,481

10 Claims. (Cl. 188—219)

This invention relates to brakes for railway vehicles and consists particularly in novel assembly of a brake beam with the brake head and strut.

Replacement of worn brake heads, struts and fulcrum arms has heretofore been a cause of substantial maintenance expense, especially where the railroad uses beams of several different standard sections such as angle, channel, and U, which vary substantially in over-all dimensions of cross-section. For instance, with members of approximate similar capacity, the angle and U-section beam compression members are both wider horizontally than the channel member and the channel and angle members are deeper vertically than the U-section member. Replacement stocks of heads and struts must be carried for each type of beam. This expense would be appreciably lessened if one type of head, strut and fulcrum could be applied to several types of beams.

A co-pending application, Serial No. 580,761, filed December 14, 1931, illustrates means for facilitating and cheapening the renewal of worn brake head, strut and fulcrum members, which means involve configuration of the beam receiving opening of the member to adapt the same for selectively mounting any of the several types of beams most commonly used.

The present invention has the same general object as stated in the above-entitled co-pending application, that is, interchangeability of heads and struts with various types of beams having different shapes and dimensions of cross section.

Another object of the present invention is to stabilize the connection between the beam and head by providing separate elements for filling the crevices between the beam and the head, especially when the head is shaped to receive various types of beams.

Another object is to simplify the assembly of the brake head with various types of beams by providing filler elements for application to the beam receiving recess of the head to adapt the same for securely mounting a particular type of beam.

These objects and others are attained by the structures illustrated in the accompanying drawings, in which—

Figure 1 is in part an elevation of and in part a vertical sectional view through a beam and head assembly illustrating one form of the invention.

Figure 2 is a detail horizontal section through the head with the compression member removed, being taken on the line 2—2 of Figure 1 and showing the filler block in place therein.

Figure 3 is an enlarged view of the filler block shown in Figures 1 and 2.

Figure 4 is a vertical section through a strut and beam assembly illustrating another form of the invention.

Figure 5 is a partial substantially horizontal section taken on the line 5—5 of Figure 4 with the compression member removed.

Figures 6 and 6a are side and end views, respectively, of the filler block used in Figure 4.

Figures 7 and 7a show brake heads as in Figure 1 but applied respectively to angle and channel beams.

Figures 8 and 9 illustrate struts as in Figure 4 but assembled with beam compression members of U and channel section, respectively.

Figures 10, 11 and 12 illustrate another type of strut and beam compression member assembly.

Figure 13 is a section taken on line 13—13 of Figure 12.

Figure 14 is a view and section similar to Figure 1 and illustrating another modification.

Figures 1 and 2 illustrate a brake head 1 including a beam receiving opening 2, similar to that illustrated in the co-pending application referred to above, the recess being of a general shape to snugly receive a channel section beam member 25 (see Figure 7a) and having diagonal slots 3 in the upper and lower forward corners for cooperating with an angle section beam member 24 (see Figure 7), and slots 4 and lugs 5 and 6 for receiving the legs of a U-section compression member 7. The opening 2 also has an angularly disposed recess 8 for receiving the tension member (not shown) of a truss-type beam.

In order to further stabilize and strengthen the assembly of the beam 7 and the head, filler blocks as shown in Figure 3 are provided, each of which includes rectangularly disposed walls 9 and 12 for abutting the sides of the beam receiving opening in the head, and legs 10 and a connecting flange 11 having curved edges shaped to snugly engage the outer face of the U-section compression member 7. A ridge 13 extends around the outer surfaces of the walls 9 and 12 of each block for cooperating with slot 14 in the inner surface of opening 2 for maintaining the block in position.

In Figure 7, the cross-section of the angle 24 has greater over-all lateral and vertical dimensions than the channel beam member 25 in Figure 7a which snugly fits within the head recess.

The forward extremities of the angle 24 extend into the diagonal notches or slots 3 in the front wall of the recess and the outer faces of the angle rest against the filler members 26 to maintain the angle and head rigidly assembled. Channel 25 does not require such filler members.

In Figures 4 and 5, a strut 15 has a generally rectangular bracket 16 at the rear end for mounting a channel compression member of the beam 28 (see Figure 9). Bracket 16 has diagonally disposed corner slots 18 receiving the legs of an angle section compression member 17 and also has slots 19 for cooperating with a U-section beam 27 (see Figure 8). The assembly is maintained by a key 20a extending through a perforation 20 in the strut and abutting the forward edges of the compression member.

The filler block 21, shown in detail in Figures 6 and 6a, is similar to the filler blocks in Figures 1, 2 and 3, the legs 22 being suitably shaped for abutting the outer surface of the angle compression member. The block has a ridge 23 for cooperating with corresponding slot in the bracket 16 to maintain the block in position.

The vertical cross-sectional dimension of the U-section 27 is less than that of the angle 17 in Figure 4, or the channel 28 in Figure 9, and the separate filler members 30 are provided to maintain the U-section in tight assembly with the strut. Key 20a cooperates in this function as previously described in connection with angle 17. The strut bracket is shaped to snugly receive the channel 28 without requiring fillers.

In Figures 10 to 13, the strut has a generally rectangular beam receiving bracket at the rear end which has no special slots or projections for cooperating with any particular type of beam, and in each form the filler blocks are relied upon to snugly maintain the assembly.

In Figure 10, the bracket 34 on the end of the strut 35 is shaped in general to receive the channel compression member 36. Abutting the inner surface of the member 36 is a U-shaped central filler member 37 having projections 38 on extremities of the legs thereof which oppose the forward edges of the legs of member 36. A securing rivet, pin or key 39 extends through projections 38 and the filler member 37.

In Figure 11, the U-section compression member 40 is maintained in position within the bracket 41 by a similarly shaped filler member 42, separate filler blocks 43, and a securing rivet or pin 44 which extends through the blocks and member 42.

In Figure 12, the angle section compression member 45 is held in position by a suitably shaped filler member 46 and filler blocks 47 and rivet or pin 50. The forward extremities of the legs of the member 45 engage surfaces 48 on the inner surface of the bracket 49.

Figure 13 more clearly illustrates the assembly of the filler block 47, member 46, and securing rivet 50. In each of the last three forms the central filler member may be eliminated and other fillers applied.

In Figure 14, an angle compression member 51 is seated in a recess 52 provided in the brake head 53 and one or more cotter pins 54 extend diagonally across the recess and through the side walls thereof to retain the assembled relation of the beam and head.

With the use of the present invention, a single brake head or strut may belong to or be properly assembled with any one of a number of beams substantially differing in shape and dimensions of cross-section. The heads and struts shown in the various forms may be securely mounted upon beams of still other shapes by the convenient utilization of suitably shaped filler blocks. Obviously, the number and positioning of the filler blocks will depend upon the shape of the beam and the beam receiving opening of the head or strut. These may be readily determined by the mechanic. A single brake beam may be provided with both heads and a strut of the type described above. The invention is also applicable to solid type brake beam assemblies in which a single longitudinal member extends between the brake heads in place of the compression and tension members in a truss type beam. For the purpose of the present specification, the strut or fulcrum of a truss beam is considered the equivalent of the fulcrum arm of a solid type beam and the compression member of a truss beam corresponds to and is the equivalent of the longitudinal beam member in a solid type beam assembly. I contemplate the exclusive use of all modifications of the inventive concept illustrated as come within the scope of my claims.

What is claimed is:

1. In a brake beam assembly, a part having a transverse recess for receiving a longitudinal member of the assembly, one side of said recess having a plurality of notches for engaging the edges of differently shaped longitudinal members of the assembly, and elements insertable between the other sides of said recess and the opposing face of the member therein for holding the member and part tightly in assembly with each other.

2. In combination, a railway brake beam device having a recess for receiving a brake beam longitudinal member, said recess being shaped to snugly mount a beam member of channel section, the front wall of said recess having grooves disposed to receive the extremities of the legs of a beam member of angle cross-section and of a beam member of U cross-section respectively, and separately formed structure for maintaining the selected beam member in proper position in said device.

3. A railway brake head with a recess shaped to mount brake beam longitudinal members of substantially different shapes and over all dimensions of cross-section, and having separately formed structure adapted to cooperate with a face of the member mounted therein to maintain the head and member relatively immovable transversely and rotationally of the axis of said member.

4. A transverse device for a brake beam assembly including a bracket for attachment to a beam longitudinal member, said bracket being shaped to snugly receive a beam member of a given cross section and a wall of said bracket being indented to snugly receive a lateral extremity of a beam member with a cross section having a substantially different over all dimension than the corresponding dimension of said first-mentioned member, and separately formed means for engaging portions of the selected members to wedge the same into tight engagement with said bracket.

5. In a brake beam assembly, a beam longitudinal member having a recessed face, a beam transverse part having a portion receiving said longitudinal member, a pin extending through said portion and spaced from said longitudinal member, and filler structure inserted between said recessed face and said pin and securing said part against rotational movement relative to said member.

6. In a brake beam assembly, a beam longitudinal member, a part disposed transversely of said member and having a recess loosely receiving said member, said recess being arranged to receive in place of said member another member having a substantially different over all dimension transverse of the length thereof than the corresponding dimension of said first-mentioned member, and separate means for insertion in said recess to maintain the selected member immovable therein rotationally and tranversely relative to said part, said means and a wall of said recess including structure for positioning said means relative to said transverse part.

7. In a brake beam assembly, a beam longitudinal member, a brake head having a recess receiving said member, said recess being arranged to receive another member having a substantially different over all dimension of cross-section than the corresponding dimension of said first-mentioned member, and separately formed means in said recess for maintaining the member inserted in said recess immovable rotationally and transversely of its axis relative to said head.

8. In a truss type brake beam, a compression member, and a strut extending transversely of said member to engage a tension member and having a bracket for receiving said compression member, said bracket being arranged to snugly receive another compression member having a different over all dimension of cross-section than the corresponding dimension of said first-mentioned compression member, and separately formed means in said bracket for maintaining the selected compression member immovable, rotationally and transversely of its axis, relative to said strut.

9. In a brake beam assembly, a beam longitudinal structural member of angle cross-section, a transverse part including a recess with a wall having slots to receive the lateral edges of the legs of said member and other slots to receive differently located edges of another structural member having a different cross-section, and separately formed structure shaped to be inserted in said recess to hold the selected member therein with its edges seated in the corresponding slots.

10. In a brake beam assembly, a beam longitudinal member of U cross section, a transverse part having a recess shaped to receive said member and to receive a corresponding member with a different cross section and having a different over all dimension transverse of the length thereof than said first-mentioned member, and separately formed filler structure for insertion in said recess for holding the member immovable therein, transversely and rotationally of its axis, relative to said part.

FREDERIC T. DE LONG.